United States Patent
Leighton

[15] 3,693,963
[45] Sept. 26, 1972

[54] VEHICLE SUSPENSION
[72] Inventor: John W. Leighton, 3820 Gratiot Ave., Port Huron, Mich. 48060
[22] Filed: Nov. 25, 1970
[21] Appl. No.: 92,635

[52] U.S. Cl. .............................267/54 A, 280/124 R
[51] Int. Cl. ..............................................B60g 11/04
[58] Field of Search...280/124; 267/54 A, 54 B, 54 R

[56] References Cited
UNITED STATES PATENTS

| 2,236,686 | 4/1941 | Jackson | 267/54 A |
| 1,835,575 | 12/1931 | Sanders | 267/54 R |
| 1,886,143 | 11/1932 | Zaparka | 267/54 A |
| 2,251,843 | 8/1941 | Jones | 267/54 B |

Primary Examiner—Philip Goodman
Attorney—Harness, Dickey & Pierce

[57] ABSTRACT

A leaf spring suspension for an automotive vehicle. The rear ends of the leaf springs are connected to the vehicle body by rubber bushed U-shackles.

4 Claims, 6 Drawing Figures

PATENTED SEP 26 1972

INVENTOR.
John W. Leighton
BY Harness, Dickey & Pierce
ATTORNEYS

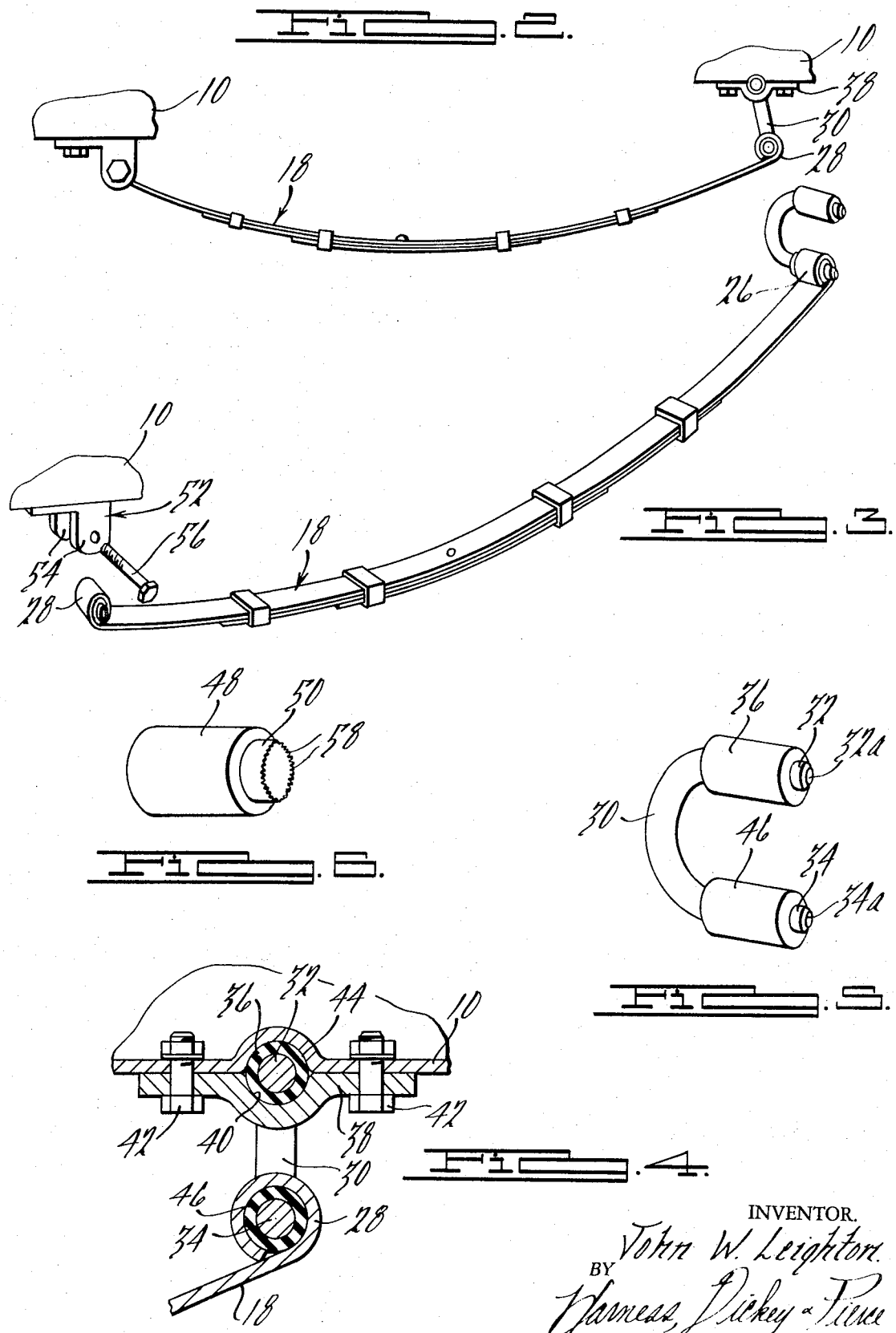

VEHICLE SUSPENSION

BACKGROUND OF THE INVENTION

This invention relates to leaf spring suspensions and particularly to a suspension in which leaf springs, U-shackles and rubber bushings are combined in a long wearing, low cost and highly effective construction. The present invention is particularly distinguished by its suitability for low cost, high volume production methods. The rubber bushings are held by friction on the shackle, thus eliminating the need for additional fastenings. The construction absorbs vibrations and shocks and provides superior body support during turning and on curves.

BRIEF DESCRIPTION OF THE FIGURES OF DRAWING

FIG. 2 is a side elevational view of the vehicle suspension of FIG. 1;

FIG. 3 is an exploded perspective view of the structure of FIG. 2;

FIG. 4 is an enlarged sectional view of the shackled end of the suspension taken along the line 4—4 of FIG. 1;

FIG. 5 is a perspective view of the rubber-bushed U-shackle of FIG. 4; and

FIG. 6 is an enlarged perspective view of the rubber-bushed sleeve shown at the front end of the suspension in FIG. 3.

DETAILED DESCRIPTION OF PREFERRED FORM OF THE INVENTION

Figure 1:
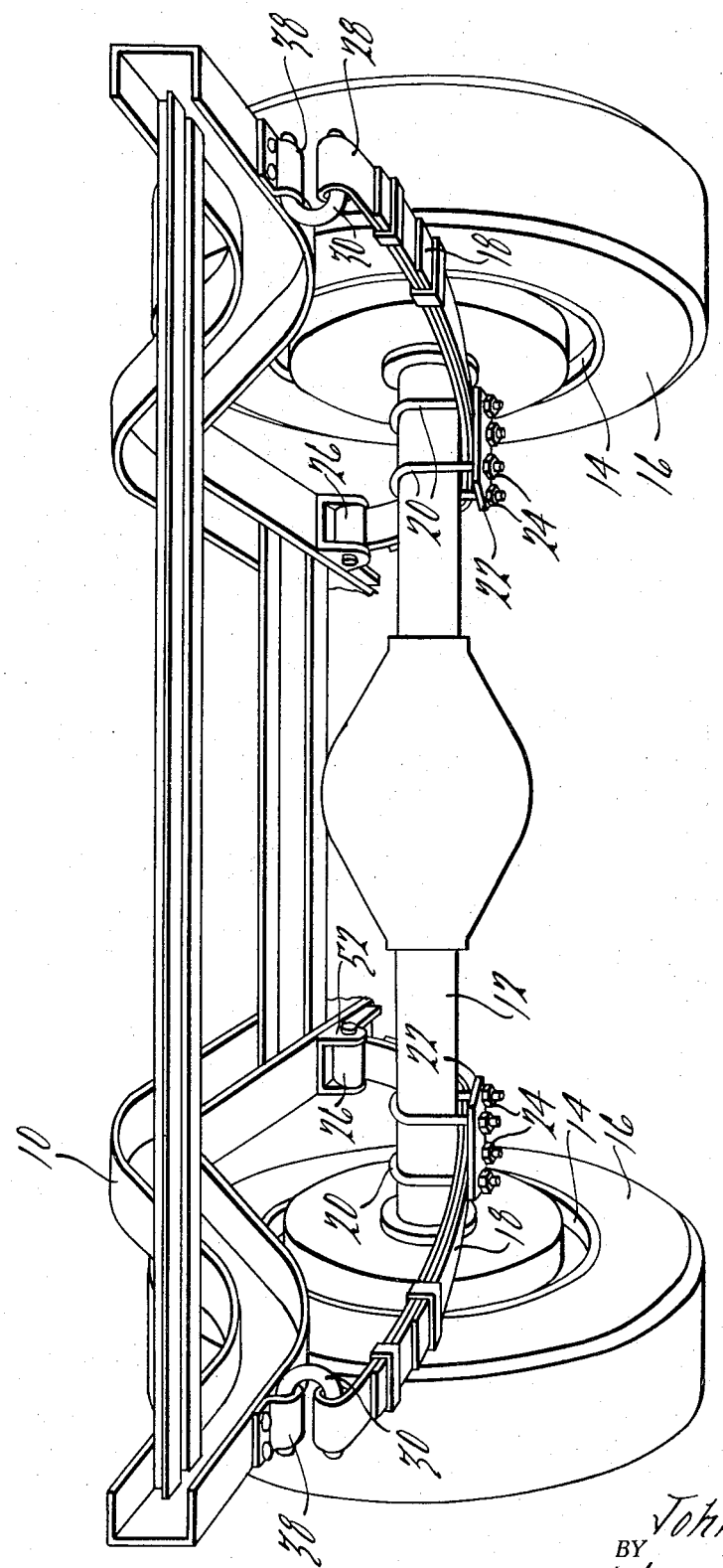
FIG. 1 is a perspective view of a portion of an automotive vehicle having a suspension constructed in accordance with the present invention.

FIG. 1 shows the suspension installed on the rear of an automobile frame 10. While the frame 10 is shown by itself, a body (not shown) is adapted to be mounted thereon. It will be understood that the suspension could be directly connected to a body, unibody or other suspended structure. The expressions "frame" and "body," as used herein, are intended to refer to any suspended portion of the vehicle.

The suspension is designed to provide a yieldable connection between the frame 10 and an axle housing 12. The axle housing 12 carries rear axles (not shown) connected to wheels 14 on which tires 16 are mounted. Although not shown in the drawings, the usual shock absorbers are intended to be connected between the frame 10 and axle housing 12.

The suspension includes a pair of leaf springs 18 joined to opposite ends of the axle housing 12 by U-bolts 20, retainer plates 22 and nuts 24. The leaf springs 18 are of the usual arcuate configuration and have raised rear and front eyes 26 and 28 respectively, at their opposite ends. The rear end of each spring 18 is connected to the frame 10 through a U-shackle 30. Each of the two U-shackles 30 is made from plain round bar steel bent to a U-shaped configuration. Each shackle 30 has an upper leg 32 and a lower leg 34. The legs 32 and 34 terminate in chamfered ends 32a and 34a.

Tightly expanded on the upper leg 32 of each U-shackle 30 is a thick-walled smooth-surfaced hollow cylindrical bushing 36 formed of 60-durometer rubber. The rubber bushing 36 is installed in a manner which creates tight frictional engagement with the surface of the leg 32. A successful method is to apply a small amount of lubricant which assists in applying the rubber bushing and which is subsequently absorbed.

A clamp 38, having a segmentally cylindrical cavity 40, is fastened to the frame 10 by screws 42. The clamp cooperates with a segmentally cylindrical recess 44 formed in the frame 10. When the screws 42 are tightened the bushing 36 is clamped between the cavity 40 and recess 44, the surfaces thereof conforming to the outer periphery of the bushing.

The lower leg 34 of the shackle 30 has a similar thick-walled smooth cylindrical rubber bushing 46 tightly expanded thereon and tightly fitted in the spring eye 28.

The U-shackles 30 and rubber-bushed metal sleeves (to be described) are installed in the springs 18 before the springs are installed on the vehicle. For this purpose the outer surface of the bushing 36 is coated with a lubricant similar to that used to install the bushings on the shackle 30. The bushing 36 is then pressed into the eye 28 under a substantial force. The lubricant is subsequently absorbed into the rubber of the bushing 36 to restore the desired friction between the eye 28 and the bushing. The shackle 30 is retained entirely by the frictional grip of the rubber.

At the forward end of each spring 18 a rubber bushing 48 of similar smooth-walled cylindrical form is tightly expanded on a hollow metal sleeve 50 and is in turn tightly held in the front eye 26 of the spring 18. The hollow sleeve 50 is tightly held in a bracket 52 attached to the frame 10, being clamped between a pair of ears 54 of the bracket by a bolt 56 passing through it. Serrations 58 on the end of the sleeve 50 hold the sleeve from rotating. The length of sleeve 50, and the spacing between the ears 54, are greater than the length of the rubber bushing 48, so that the bushing is not trapped or compressed at its ends. Each spring 18 is also narrower than the spacing between the ears, and each eye 26 is centered within its bracket 52 by its frictional engagement with the rubber bushing 48.

All of the metal surfaces which contact the rubber bushings 36, 46 and 48 are engaged therewith so tightly that little or no slippage can occur between the rubber and the metal surfaces. The rubber bushings flex to permit rotation around the axes of the spring eyes and can also flex in other ways as during cornering of the vehicle. Normal oscillatory movement of the legs 32 and 34 is accommodated by movement within the rubber of the bushings 36 and 46 and without friction between said legs and their bushings. However, some surface friction can occur between the legs 32 and 34 and the bushings 36 and 46 at the inner ends of the legs.

The present invention possesses an important safety advantage which helps in preventing the vehicle from rolling over on a curve. When the vehicle is steered in either direction, the bushings 36 and 46 will compress to permit the rear ends of the springs 18 to twist somewhat. This causes the wheels to travel in an increased radius around the outer side of the curve which better supports the body against rolling. The U-shackles 30 are also self-aligning.

It should be noted that compression of the various bushings under the loads applied to the suspension during usage does not have a destructive effect on the bushings. This is believed to be due, at least in part, to the fact that the bushings 36 and 46 are not confined at their ends. Tests have shown that the bushings 36 and 46 have withstood one million compressive cycles without fatigue.

This detailed description of preferred form of the invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent Office.

What is claimed is:

1. A spring suspension for a vehicle having a frame including a leaf spring having a cylindrical eye at one end thereof, a U-shackle having a pair of parallel legs, a first one of said legs being disposed in said eye and a second one of said legs being disposed above said first leg, a smooth cylindrical thick-walled rubber bushing expanded on said first leg and in tight frictional engagement both with said eye and said first leg, a second smooth cylindrical thick-walled rubber bushing expanded on said second leg and in tight frictional engagement therewith, clamping means on said frame clampingly engaging said second bushing, and means pivotally connecting the end of said spring opposite said eye to said frame.

2. A suspension as defined in claim 1 wherein the axial end surfaces of all of the rubber bushings are entirely free of engagement with any other parts.

3. A suspension as defined in claim 1 wherein said shackle comprises a steel rod of circular cross section bent to a U configuration and being free of fasteners at its ends.

4. In combination with a leaf-type vehicle spring having an eye at each end, a U-shackle for attaching one end of the spring to the vehicle, said shackle having one leg in the eye, a thick-walled smooth cylindrical rubber bushing tightly expanded on the outside of said leg which is in the eye, said rubber bushing having its outer surface tightly engaging the interior of the eye, means including a second thick-walled smooth cylindrical rubber bushing tightly expanded on the other leg of the U-shackle for connecting said other leg to a vehicle body or frame structure, and a joint for connecting the other end of the spring to the vehicle including a third thick-walled smooth cylindrical rubber bushing tightly expanded on the outside of an internal joint member which extends through the interior of said third rubber bushing and tightly held inside the other eye.

* * * * *